April 6, 1926.  
D. A. CUTLER  
1,579,650  
MANUFACTURE OF CANVAS UPPER SHOES  
Filed June 30, 1925
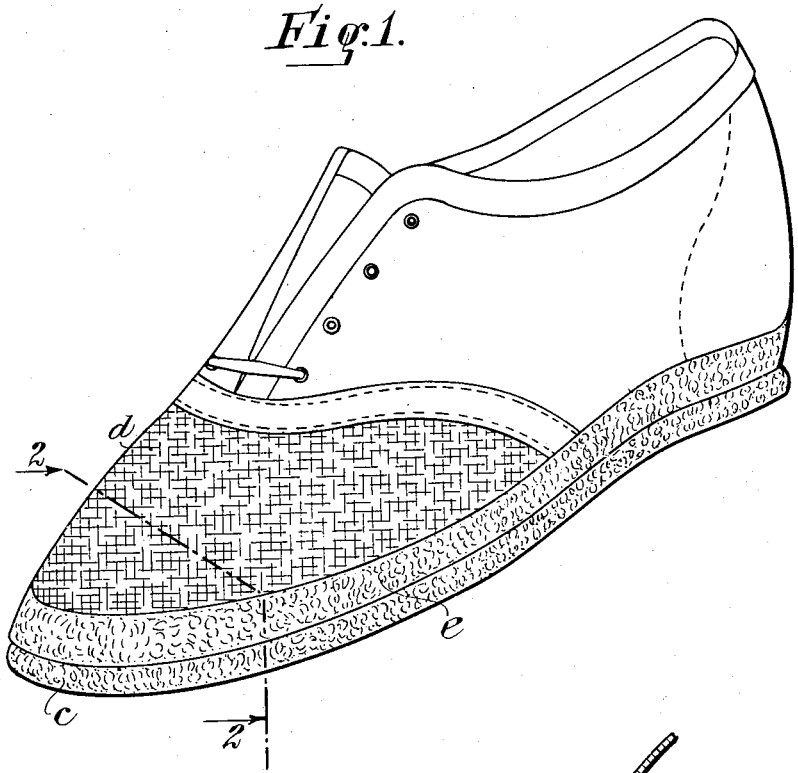
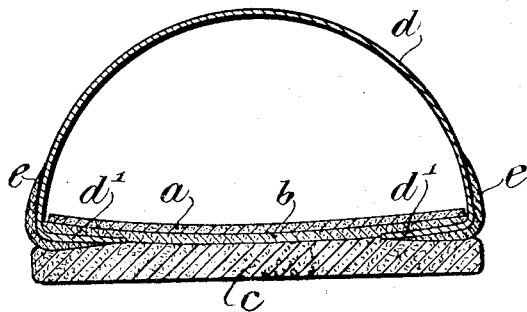
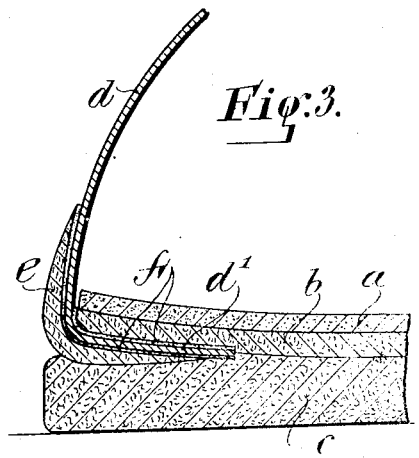
INVENTOR  
David A. Cutler  
BY  
Redding, Greeley, O'Shea & Campbell  
ATTORNEYS Patented Apr. 6, 1926.

1,579,650

UNITED STATES PATENT OFFICE.

DAVID A. CUTLER, OF QUINCY, MASSACHUSETTS, ASSIGNOR TO ALFRED HALE RUBBER COMPANY, OF ATLANTIC, MASSACHUSETTS, A CORPORATION OF MASSACHUSETTS.

MANUFACTURE OF CANVAS-UPPER SHOES.

Application filed June 30, 1925. Serial No. 40,493.

*To all whom it may concern:*

Be it known that I, DAVID A. CUTLER, a citizen of the United States, residing in the city of Quincy, county of Norfolk, and State of Massachusetts, have invented certain new and useful Improvements in the Manufacture of Canvas-Upper Shoes, of which the following is a specification, reference being had to the accompanying drawing, forming a part hereof.

This invention relates particularly to the construction of shoes of light weight, generally used for sport purposes, and having uppers of canvas or duck or other fabric and soles of rubber, with protecting strips of rubber or rubber and cloth carried from the soles upward on the uppers for a short distance for the purpose of excluding moisture which might otherwise penetrate the uppers above the soles. The rapidly increasing use of unvulcanized crepe rubber for the soles of heavier sport shoes, generally made with uppers of leather which do not require such protecting strips, has drawn attention to the desirability of unvulcanized crepe rubber for the soles of the lighter and less expensive shoes above referred to, which are commonly known as canvas-upper shoes. Hitherto, however, no practicable method of applying the protecting strip has been developed. Sewing of the strip at its upper edge to the upper is not desirable. The use of rubber cement, from which the volatile matter evaporates, leaving a film of rubber between the fabric and the protecting strip, does not make an enduring union. It is possible to effect a good union of the rubber protecting strip and the fabric upper by subjecting the shoe to a vulcanizing process after the upper has been lasted on the sole, but such vulcanization destroys the desirable qualities of the unvulcanized crepe rubber sole, which are fully realized only if the sole remains unvulcanized. In the endeavor to solve the problem which is thus presented and to produce a shoe of the character referred to, in which a firm and enduring union of the protecting strip with the fabric upper as well as with the unvulcanized crepe rubber sole is effected, and in which the desirable qualities of the unvulcanized crepe rubber sole are not lost through vulcanizing, it has been found that the desired results can be accomplished by forming the union between the protecting strip and the fabric upper as well as with the sole, by the use of thickened latex, that is to say latex in which, through partial elimination of the watery content, the content of caoutchouc has been increased from the usual content of about 35 percentum to a content of somewhere about 60 percentum. Latex of the ordinary consistency, that is latex in its natural condition, does not form a good union with the fabric, possibly because of too much absorption, but the thickened latex, before coagulation has set in, applied between the protecting strip and the cloth upper, has been found to make a permanent union between the protecting strip and the fabric upper. It will be understood that the latex is used in its natural condition, except for the elimination of a portion of the watery content, and that the coagulating or preliminary setting of the caoutchouc content is not permitted to take place before the application of the latex, but only after its application and the assembling of the parts to be united.

The invention will be more fully explained hereinafter with reference to the accompanying drawing in which it is illustrated and in which:

Figure 1 is a view in elevation of a canvas-upper shoe which embodies the invention.

Figure 2 is a section on the plane indicated by the broken line 2—2 of Figure 1, but on an enlarged scale.

Figure 3 is a partial section on a still larger scale and somewhat exaggerated so as to show details of construction.

In order that all of the advantages for the use of unvulcanized crepe rubber may be retained, the improved shoe is made with a compound inner sole, consisting of a sheet *a* of vulcanized fiber or other material desirable for contact with the feet, and a sheet *b* of unvulcanized crepe rubber, and an outer sole *c* of unvulcanized crepe rubber, these three elements being secured together in any suitable manner, as by the use of cement. Before the outer sole *c* is secured to the compound inner sole, the upper *d*, of a suitable fabric, such as light canvas or duck, is lasted to the compound inner sole, its edge being preferably lapped under the edge of the compound inner sole, as shown at $d^1$. The outer sole $c$ is then applied and secured. It is necessary in shoes of this character that a protective strip be applied to the edge of the sole and be carried up on the upper $d$. In accordance with the present invention, such protective strip $e$, also formed of unvulcanized crepe rubber, is secured to the edge of the outer sole $c$ and to the edge of the compound inner sole $a$, $b$, and to the upper $d$ by the application to the inner face of the protective strip and to the edge of the sole and the upper of a film $f$, shown in exaggerated form in Figure 2, of thickened, natural latex, that is, of latex in its natural condition, with the caoutchouc not coagulated but with the water content of the latex reduced so that the percentage of caoutchouc in the thickened latex is increased from the normal percentage of about 35 per centum to a percentage of about 60 per centum. In the attempt to produce shoes of this character with unvulcanized crepe rubber soles, it has been found that enduring adhesion of the protective strip to the fabric upper cannot be secured by the use of cement, that the attempt to secure the protective strip by the process of vulcanizing destroys the desirable qualities of the unvulcanized or crepe rubber sole, and that a good adhesion between the protective strip and the fabric upper cannot be secured with the thin latex, which has a content of caoutchouc of somewhere about 35 per centum and a watery content of somewhere about 65 per centum, but is secured when the latex is applied in such condition that coagulation of the latex takes place after application.

In the preparation of the thickened latex, which must be in all other respects in its natural condition, care must be taken that the caoutchouc content of the latex is not coagulated and when such coagulation is avoided, before application, and the thickened latex is applied, it is found that an enduring and permanent union between the unvulcanized protective strip and the fabric upper, as well as between the unvulcanized protective strip and the edge of the soles, is secured in the process of coagulation after application, and the desirable qualities of the unvulcanized crepe rubber sole are retained in full degree.

I claim as my invention:

1. A canvas-upper shoe having an insole, an unvulcanized crepe rubber outer sole secured to the insole, a fabric upper, an unvulcanized crepe rubber protective strip, and a film of thickened latex uniting the unvulcanized protective strip to the fabric upper and the edge of the sole.

2. A canvas-upper shoe having an insole with its lower face of unvulcanized rubber, a fabric upper lasted to the sole with its edge lapped under the edge of the insole, an unvulcanized rubber outer sole cemented to the insole, and a protective strip of unvulcanized rubber with a film of thickened latex uniting the protective strip to the fabric upper and to the edge of the sole.

3. An improvement in the manufacture of shoes with a fabric upper, an outer sole of unvulcanized rubber and a protective strip of unvulcanized rubber, which consists in uniting the protective strip to the fabric upper and to the edge of the sole by the application of thickened latex before coagulation.

This specification signed this 24th day of June, A. D. 1925.

DAVID A. CUTLER.